United States Patent
Peter et al.

(10) Patent No.: US 11,243,797 B2
(45) Date of Patent: Feb. 8, 2022

(54) METHOD FOR OPERATING A CONTROL DEVICE, CONTROL DEVICE AND COMPUTER PROGRAM PRODUCT

(71) Applicant: OpenSynergy GmbH, Berlin (DE)

(72) Inventors: Michael Peter, Berlin (DE); Axel Söding-Freiherr Von Blomberg, Berlin (DE)

(73) Assignee: OpenSynergy GmbH, Berlin (DE)

( * ) Notice: Subject to any disclaimer, the term of this patent is extended or adjusted under 35 U.S.C. 154(b) by 160 days.

(21) Appl. No.: 16/481,837

(22) PCT Filed: Jan. 25, 2018

(86) PCT No.: PCT/EP2018/051854
§ 371 (c)(1),
(2) Date: Jul. 30, 2019

(87) PCT Pub. No.: WO2018/141629
PCT Pub. Date: Aug. 9, 2018

(65) Prior Publication Data
US 2021/0103455 A1    Apr. 8, 2021

(30) Foreign Application Priority Data
Jan. 31, 2017    (EP) .................................... 17153995

(51) Int. Cl.
*G06F 9/455*    (2018.01)
*G06F 9/445*    (2018.01)
(52) U.S. Cl.
CPC ...... *G06F 9/45558* (2013.01); *G06F 9/44536* (2013.01); *G06F 9/4555* (2013.01)

(58) Field of Classification Search
CPC ..... G06F 9/45558; G06F 9/4555; G06F 9/451
See application file for complete search history.

(56) References Cited

U.S. PATENT DOCUMENTS

| | | | |
|---|---|---|---|
| 2003/0036843 A1 | 2/2003 | Okude et al. | |
| 2004/0215791 A1 | 10/2004 | Tsao | |
| | (Continued) | | |

FOREIGN PATENT DOCUMENTS

| | | |
|---|---|---|
| CN | 201867790 U | 6/2011 |
| EP | 0917057 A2 | 5/1999 |
| | (Continued) | |

OTHER PUBLICATIONS

International Search Report for Patent Application No. PCT/EP2018/051854, dated Mar. 14, 2018, 2 pp.
(Continued)

*Primary Examiner* — Dong U Kim
(74) *Attorney, Agent, or Firm* — Soquel Group LLC

(57) ABSTRACT

A method including running a virtualization layer on a processor, the virtualization layer being adapted to assign processor time and memory to first and second guest operating systems running on the virtualization layer, wherein the first guest operating system is a real time operating system, obtaining, by the second guest system, information to be displayed on a display, preparing, by the second guest system, a display frame to be sent to the display, reading, by the first guest system, a portion of the display frame, or retrieving, by the first guest system, information about a read portion of the display frame, and determining, by the first guest system, whether the information sent to the second guest system is correctly generated in the display frame.

17 Claims, 3 Drawing Sheets

(56) References Cited

U.S. PATENT DOCUMENTS

| | | |
|---|---|---|
| 2008/0244254 A1 | 10/2008 | Cromer et al. |
| 2008/0307180 A1 | 12/2008 | Hattori et al. |
| 2011/0154328 A1 | 6/2011 | Mo et al. |
| 2011/0173319 A1 | 7/2011 | Ha et al. |
| 2012/0215407 A1 | 8/2012 | Goy |
| 2013/0293557 A1 | 11/2013 | Diard |
| 2014/0067917 A1 | 3/2014 | Kim et al. |
| 2014/0125802 A1* | 5/2014 | Beckert .................. H04N 5/213 348/148 |
| 2015/0058611 A1 | 2/2015 | Reeves et al. |
| 2015/0116310 A1 | 4/2015 | Baudouin et al. |
| 2015/0193285 A1 | 7/2015 | Hamzata et al. |
| 2016/0138968 A1* | 5/2016 | Staudenmaier .......... G09G 5/10 250/208.1 |
| 2016/0193285 A1 | 7/2016 | Haviv |
| 2016/0328272 A1* | 11/2016 | Ahmed ................ G06F 9/4881 |

FOREIGN PATENT DOCUMENTS

| | | | |
|---|---|---|---|
| EP | 1526424 | A2 | 4/2005 |
| EP | 1526426 | A2 | 4/2005 |
| EP | 1677190 | A2 | 7/2006 |
| WO | 2005015390 | A1 | 2/2005 |
| WO | 2005026918 | A2 | 3/2005 |
| WO | 2006072101 | A2 | 7/2006 |
| WO | 2008005722 | A1 | 1/2008 |
| WO | 2008130923 | A1 | 10/2008 |
| WO | 2010078143 | A2 | 7/2010 |
| WO | 2011066472 | A1 | 6/2011 |
| WO | 2011081935 | A2 | 7/2011 |
| WO | 2012045078 | A2 | 4/2012 |
| WO | 2012145024 | A1 | 10/2012 |
| WO | 2013182140 | A1 | 12/2013 |
| WO | 2014051781 | A1 | 4/2014 |
| WO | 2014085717 | A1 | 6/2014 |
| WO | 2014099763 | A1 | 6/2014 |
| WO | 2014109502 | A1 | 7/2014 |
| WO | 2014137970 | A1 | 9/2014 |
| WO | 2015002851 | A1 | 1/2015 |

OTHER PUBLICATIONS

European Search Report for EP Patent Application No. 17153995, completed Mar. 21, 2017, 7 pp.

* cited by examiner

METHOD FOR OPERATING A CONTROL DEVICE, CONTROL DEVICE AND COMPUTER PROGRAM PRODUCT

CROSS-REFERENCE TO RELATED APPLICATIONS

This application claims benefit under 35 USC § 371 of PCT Application No. PCT/EP2018/051854 entitled METHOD FOR OPERATING A CONTROL DEVICE, CONTROL DEVICE AND COMPUTER PROGRAM PRODUCT, filed on Jan. 25, 2018 by inventors Michael Peter and Axel Söding Freiherr von Blomberg. PCT Application No. PCT/EP2018/051854 claims priority of European Patent Application No. 17 153 995.0, filed on Jan. 31, 2017.

FIELD OF THE INVENTION

The present invention concerns a method for operating a control device comprising at least one processor and at least one memory connected to the at least one processor.

Further, the present invention relates to a computer program product comprising commands for executing the method.

In addition, the present invention relates to a control device comprising: at least one processor and at least one memory connected to the at least one processor, and a virtualization layer adapted to run on the at least one processor, the virtualization layer being adapted to assign processor time and memory to a plurality of guest systems running on the virtualization layer, the plurality of guest systems comprising a first guest operating system and a second guest operating system, wherein the first guest operating system is a real time operating system.

BACKGROUND OF THE INVENTION

Some systems for displaying safety-critical functions on a display comprise two physical platforms, one for non-safety-critical functions and one for safety-critical functions. Non-safety-critical functions can run on an operating system that is not qualified for functional safety. To display safety-critical information (for example critical warning lights) on a digital instrument screen, the critical information is not rendered to the digital display, but shown with the help of additional LEDs that have been integrated to the physical display hardware, but are controlled by a separate control device.

WO 2014/109502 A1 discloses a touch event processing method and a portable device implementing the same. The portable device includes at least two operating systems. An OS monitor is interposed between the operating systems. The first OS displays an image and using a first security application the second OS processes the touch events of a second security application. However, such a system is not suitable for displaying safety-critical functions on a display.

Some systems run safety-critical components on the top of a certified operating system. In all cases, when the critical functions use complex device drivers, like a graphics stack, these device drivers need qualification, too. To qualify the operating system and all affected device drivers may become very expensive or even impossible, e.g. if the underlying hardware device is not qualified.

SUMMARY OF THE DESCRIPTION

In light of the above, a method is provided for operating a control device comprising at least one processor and at least one memory connected to the at least one processor, the method comprising:

running a virtualization layer on the at least one processor, the virtualization layer being adapted to assign processor time and memory to a plurality of guest systems running on the virtualization layer, the plurality of guest systems comprising a first guest operating system and a second guest operating system, wherein the first guest operating system is a real time operating system, obtaining, by the second guest system, information to be displayed on at least one display;

preparing, by the second guest system, at least one display frame to be sent to the at least one display;

reading, by the first guest system, at least one portion of the at least one display frame or retrieving, by the first guest system, information about a read at least one portion of the at least one display frame, and determining, by the first guest system, whether the information sent to the second operating system is correctly generated in the display frame based on the at least one portion.

Further embodiments may comprise the following features in any technical feasible combination:

- a width of the display frame to be sent to the display is at least 5 times higher, in particular 20 times higher, for example at least 50 times higher than a width of a portion of the display frame; and/or a height of the display frame to be sent to the display is at least 5 times higher, in particular at least 20 times higher, for example at least 50 times higher than a height of a portion of the display frame;
- the method further comprises writing, by the second guest system, the display frame to be sent into a data output memory of a graphic controller, in particular a frame buffer, wherein reading, by the first guest system, at least one portion of the at least one display frame includes reading, by the first guest system, the at least one portion of the at least one display frame from the data output memory, wherein the method in particular includes determining the location of the display frame in the data output memory;
- the method further comprises:—providing, by the second guest system, to a graphic controller the at least one display frame to be sent, and—rendering, by the graphic controller, the at least one display frame to be sent to the at least one display, wherein, retrieving, by the first guest system, the information about a read at least one portion of the at least one display frame, includes: obtaining from a display data checking hardware module at least one result about a check, performed by the display data checking hardware module, whether at least one portion of the at least one display frame rendered by the graphic controller and read by the display data checking hardware module includes the information sent to the second operating system is correctly generated in the display frame based on the at least one portion;
- the method further comprises:—providing, by the second guest system, to a graphic controller the at least one display frame to be sent,—capturing, by an image grabbing device, at least one portion of the at least one frame sent from the graphic controller to the at least one display, in particular at a display port,—storing, the at least one portion of the at least one grabbed frame in a memory, wherein reading, by the first guest system, at least one portion of the at least one display frame includes reading, by the first guest system, the at least one portion of the at least one grabbed frame;
- the at least one portion is or are located on the display frame at a position, where the information obtained by the second guest system should be displayed, wherein, in particular, the method further comprises determining, by the first guest system, the position on the display frame of the at least one portion of the at least one display frame depending on the information to be displayed;

the method further comprises determining whether the information is generated in the display frame within a predefined time period;

determining whether the information obtained by the second system is correctly generated includes using an image processing method to determine the content of the at least one portion, for example determining a check sum of the at least one portion before and after the preparation of the display frame and comparing the check sum, determining a check sum of the at least one portion and comparing the determined check sum with a stored check sum, using a digital filter and/or a best fit algorithm to determine a position of a needle in the at least one portion; and/or compared the at least one portion with a stored image, and/or includes analyzing the at least one result obtained from the a display data checking hardware module;

the first guest system only reads every second or third line and/or row of the at least one portion of the at least one display frame for determining whether the information sent to the second guest system is correctly generated;

obtaining information by the second guest system includes obtaining a value, in particular of a safety-critical information, in particular a speed value, a rotational speed value, a consumption value, a battery value, and the like;

if it is determined that the information is not generated in a predefined time period and/or is not correctly generated, the method further comprises: commanding the control device to enter a safe state, in particular to display a blank screen, to switch off the display backlight, to display a default screen and/or to fall back to a simpler rendering scheme; and/or commanding a fault recovery, for example rebooting the second guest system, rebooting the control device, reset the display hardware, to restart a module generating the at least one display frame, and/or switching to a third guest system being redundant to the second guest operating system, wherein, in particular, the safe state remains activated until the second or third system generates correctly the information in a display frame.

the display is a display of an instrument cluster of a vehicle and/or the information is safety-critical information; and/or obtaining, by the second guest system, of information includes: sending, by the first guest system, information to the second guest system to be displayed on a display.

According to another aspect a computer program product is provided comprising commands for executing the method according an embodiment disclosed herein, when loaded and executed on one or more processors. According to an embodiment a computer program product may be a physical software product, for example a hard disc, a solid state disc, a CD-ROM, a DVD, comprising the program.

According to other aspects, the present invention relates to non-volatile memory, for example a hard disc, a solid state disc, a CD-ROM, a DVD, including a program containing commands for executing the method according an embodiment disclosed herein, when loaded and executed on a processor.

According to a further aspect a control device comprising: at least one processor and at least one memory connected to the at least one processor, a virtualization layer adapted to run on the at least one processor, the virtualization layer being adapted to assign processor time and memory to a plurality of guest systems running on the virtualization layer, the plurality of guest systems comprising a first guest operating system and a second guest operating system, wherein the first guest operating system is a real time operating system, the second guest system, being adapted to obtain information to be displayed on at least one display;

the second guest system, being adapted to generate at least one display frame to be sent to at least one display, the first guest system being adapted to read at least one portion of the at least one display frame or to retrieve information about a read at least one portion of the at least one display frame, and to determine, based on the at least one portion, whether the information sent to the second operating system is correctly generated in the display frame.

The present invention may also relate to a vehicle comprising a control device according to an embodiment disclosed herein and comprising a display for an instrument cluster, wherein the control device is adapted to control the display.

According to embodiments, it is possible to place a module that treats the safety-critical information on top of an operating system that cannot be qualified for functional safety, for example Linux or Windows, which runs inside a virtual machine or guest system, in particular the second guest system, provided by a virtualization layer.

The solution is a combination of the following techniques: supervision or monitoring of the calculation results of all safety-critical functions and/or supervision or monitoring of the real-time behavior of the module treating the safety-critical information.

In an embodiment, a redundancy of the partition containing the module treating the safety-critical information together with its operating system, with the purpose to increase the availability of the safety-critical functions.

An advantage of the invention is a reduction of cost for the development of safety-critical functions.

A further advantage of our solution is the potential to develop even more complex safety-critical functions, which are for example needed for autonomous driving, with reasonable effort and cost.

Further advantages, features, aspects and details are evident from the dependent claims, the description and the drawings.

BRIEF DESCRIPTION OF THE DRAWINGS

So that the manner in which the above recited features of the present invention can be understood in detail, a more particular description of the invention, briefly summarized above, may be read by reference to embodiments. The accompanying drawings relate to embodiments of the invention and are described in the following.

DETAILED DESCRIPTION

Figure 1:
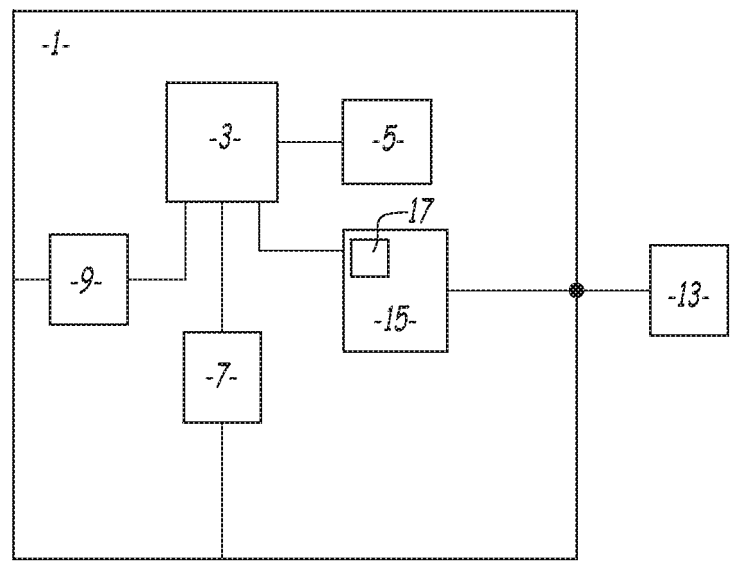
FIG. 1 shows schematically an electronic control unit (ECU)

FIG. 1 shows schematically an electronic control unit (ECU) 1. The ECU 1 might be also called control device in the present patent application. For example, the ECU 1 is realized as a system on chip (SoC). According to an embodiment, an ECU comprises one or more processors 3 forming at least one central processing unit (CPU) connected to one or more memories 5. Further, the ECU 1 may comprise an interface for connecting to one or more bus systems, for example one or more hardware controller 7 for at least one controller area network (CAN) bus, one or more hardware controller for at least one Ethernet connection and/or one or more hardware controller 9 for at least one FlexRay bus (not shown). CAN and FlexRay bus systems are dedicated for use in automotive vehicles.

Usually, an automotive vehicle comprises a plurality of electronic control units 1 (ECU), which may be assigned to different units of the vehicle, for example the steering wheel, the brakes, the windows, the motor etc. For example, the ECU may be connected to some sensors or drivers via an interface, for example to drive the window, or to sense the angulation of the steering wheel, the level of oil or water in the motor. Some ECUs 1 are providing information for the user of the vehicle, for example information about the status of the vehicle, for example, the speed, the state of the equipment like the brakes or the batteries, whether the passengers have fastened their seat belts, temperature information, and the like. These ECUs may be connected to one or more displays 13 via one or more display ports 11 to display that information if necessary.

Further, the ECU 1 includes a graphic controller 15 connected to the one or more display ports 11, for example a graphic processing unit. A graphics processing unit (GPU) is a device specifically adapted for calculating and/or rendering graphics, for example two or three dimensional graphics. For that purpose the GPU has a highly parallel structure, where processing of data is done in parallel.

According to an embodiment, the graphic controller 15 is separated from the one or more processors 3. In other embodiments, the graphic controller 15 is integrated into the one or more processors 3.

According to an embodiment, the graphic controller 15 includes a data output memory, for example frame buffer 17. The frame buffer 17 is a portion of a memory of the graphic controller 15 that contains a bitmap, corresponding to a complete frame, that is used to refresh the at least one display 13. For example, the data output memory, in particular the frame buffer 17, includes information for every pixel of the at least one display 13.

Figure 2:
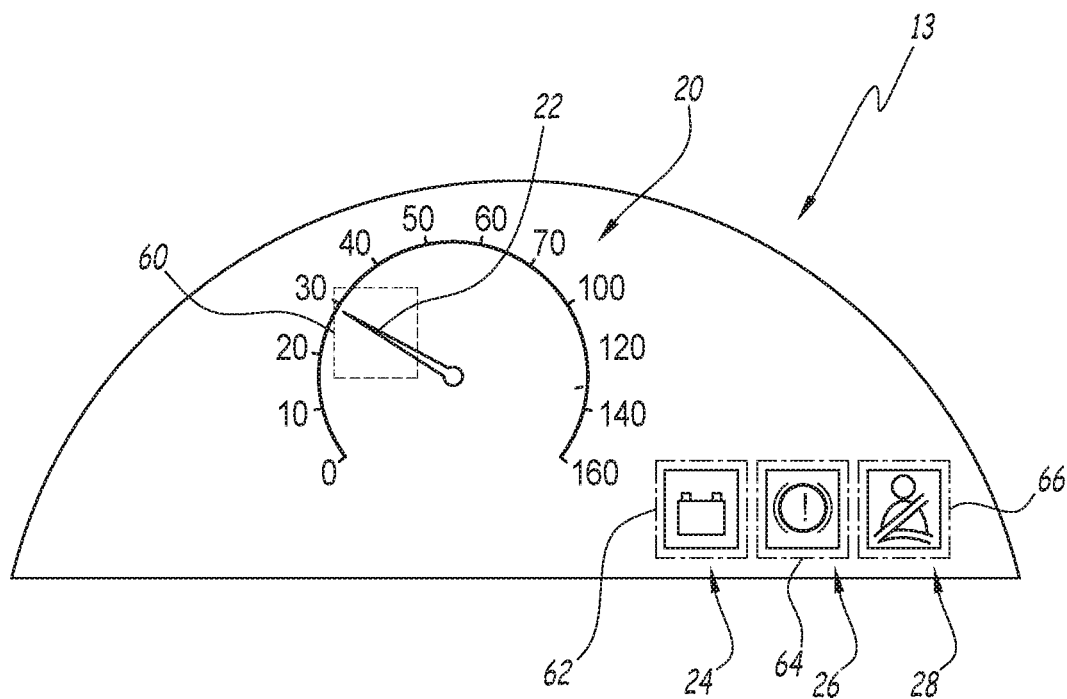
FIG. 2 shows schematically a display of a vehicle.

FIG. 2 shows schematically the display 13. The display 13 is provided for an instrument cluster of a vehicle, in particular an automotive vehicle. The display 13 is for example an active or passive electronic display. For example, the display 13 displays a plurality of conditions of the vehicle or the engine. According to an embodiment, the display 13 is adapted to display safety-critical information and safety-uncritical information at the same time.

Safety-critical information is information, which is of high importance, in particular for the safety of the vehicle, for a conductor or passenger of a vehicle or the surroundings of a vehicle, for example warning light information, speed information, battery information, gear information, rotational speed information, and the like.

Safety-uncritical information is information, which is not necessary for the safety of a conductor or passenger of the vehicle or the surroundings of a vehicle, for example map information, multimedia information, fuel tank information, consumption information, and the like.

The display 13 shows a speedometer 20 displaying the speed of the vehicle. The speedometer 20 includes a needle 22 adapted to show the actual speed of the vehicle. The position of the needle 22 is dependent on the speed of the vehicle, like for analog instrument clusters. In other embodiments, the speedometer 20 may display the speed using digital characters. The speed is an example of safety-critical information presented by an instrument to the vehicle driver.

Further, the display 13 is adapted to show a battery symbol 24, a brake symbol 26, and a belt symbol 28. The battery symbol 24 is displayed if the vehicle has, for example, a low battery charge, in particular below a predefined threshold. The brake symbol 26 is displayed if there are problems with the brake of the vehicle or when the hand brake is activated. The belt symbol 28 is displayed if a passenger has not fastened its seat belts. The symbols 24, 26, 28 provide safety-critical information to the conductor or a passenger of a vehicle. In other embodiments, there are further symbols and information that may be safety-critical.

In embodiments, the display 13 has a width of above 2000 pixels, for example between 2000 and 4000 pixel and a height of more than 500 pixels, for example between 500 and 1000 pixels. According to an embodiment, the aspect ratio of the display is between 4 (width) to 1 (height) and 3 to 2. In other embodiments, the height is more important than the width.

Figure 3:
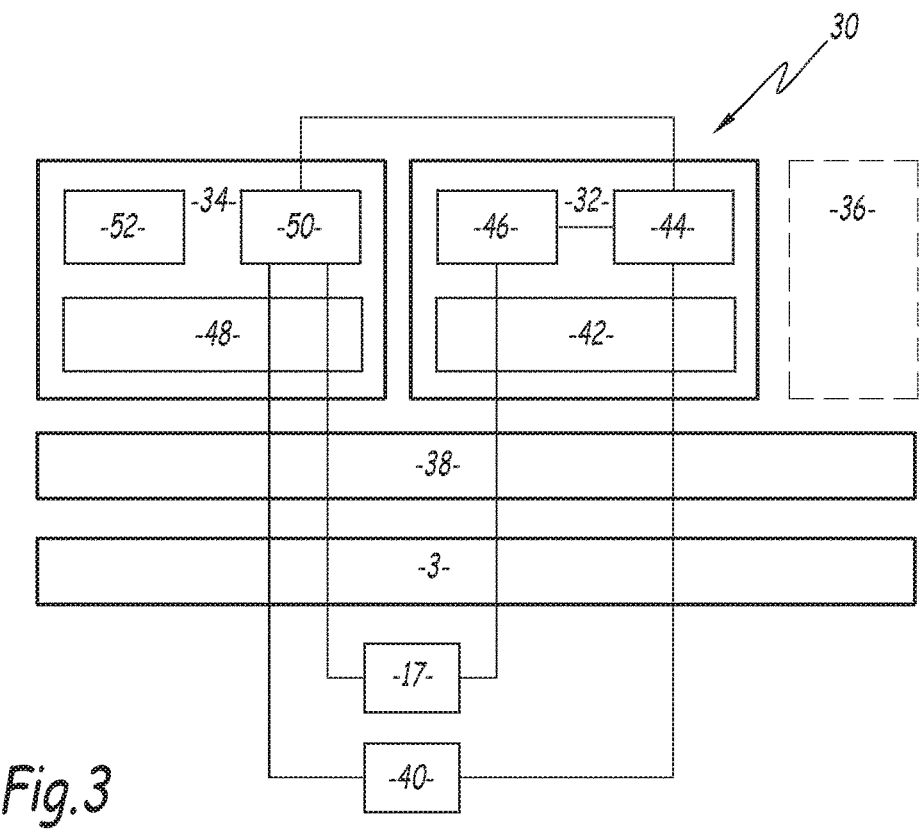
FIG. 3 shows schematically a system according to an embodiment.

FIG. 3 shows schematically a system 30 of the ECU 1 running on the at least one CPU 5.

The system 30 comprises a plurality of guest systems 32, 34, 36, for example guest operating systems, each running on a separate partition. The guest systems 32, 34, 36 are running via a virtualization layer 38, for example a microkernel or a hypervisor, on the at least one processor 3 of the ECU 1. In other words, the virtualization layer 38 enables several operating systems to simultaneously run on the one or more processors 3.

One example of a virtualization layer 38 is a hypervisor between the hardware, for example a system on chip (SoC), and guest systems 32, 34, 36. The hypervisor is adapted to run directly on the hardware, in particular the at least one processor 3, to control the hardware and to manage the guest systems. The hypervisor is adapted to define a simulated hardware for the guest systems installed. Further, the hypervisor is adapted to assign the hardware resources to the respective guest systems.

Another example of a virtualization layer 38 is a microkernel operating system, which is used as a virtualization layer between the hardware and guest systems. The microkernel runs directly on the hardware. A microkernel is a minimal operating system construct, which makes mechanisms available in order to implement operating system services. This comprises substantially: the management of the address space, the provision and management of mechanisms for separating program sections and their thread management and scheduling, and mechanisms for communication between different guest systems or partitions (inter-partition-communication (IPC)).

The virtualization layer 38 is adapted to assign the hardware resources, for example the processor time and/or memory to the respective guest systems and to provide inter partition communication (IPC) links between the different guest systems 32, 34, 36. Further, the virtualization layer 38 separates the different guest systems to avoid interference between the guest systems 32, 34, 36.

FIG. 3 shows a data input source 40, for example an automotive bus, a sensor input, or the like. The data input source 40 provides the safety-critical information, in particular of a vehicle, for example a value of the safety-critical information, for example a speed value, a binary value indicating whether a symbol on the display has to be shown, or another value. According to an embodiment, the data input source 40 is one of or a combination of an input device or its associated memory, the output of another component contained within first guest system 32, or the output of a component contained in another guest system 36. Optionally, the system 30 may include one or more further guest systems 36.

A first guest system 34 is a real-time system, in particular including a real-time operating system 42. Thus, according to embodiments, the virtualization layer 38 is adapted to support real-time guest systems and non-real-time guest systems.

For example, a real-time (operating) system has pre-defined or guaranteed response times. According to an embodiment, it has predictable response times and deterministic behavior, in particular for the scheduling and the memory management.

According to embodiments, the first guest system 32 is adapted to run a safety qualified operating system 42. Further, the guest system is adapted to run a first monitoring module 44 and a second monitoring module 46 on the operating system 42.

The second guest system 34 is adapted to run an operating system 48, which is not qualified for safety, for example the operating system may be Windows or Linux.

Qualified for safety means that the guest system conforms to a standard for safety critical systems, which, in particular, defines how the systems should be developed, tested, and/or documented. For example ISO 26262 is such a standard of the international organization for standardization, in particular the version published in 2011 and 2012. This standard defines includes for example safety requirements in the scope of the vehicle, safety analysis in the scope of the device to be performed before the development starts, safety requirements in the scope of the device, derived from the safety analysis, the development process: conforming to (A)SPICE standard, the tests (quality and quantity), the process documentation and provisions of a safety manual (which tells how to use a product in order to support safety properties).

According to the embodiment of FIG. 3, the first guest system 32, in particular the first monitoring module 44, and the second guest system 34, in particular the first module 50, have access to the data input source 40.

A data output memory, in particular the frame buffer 17, is accessible by both the first and second guest systems 32, 34. For example the data output memory, in particular the frame buffer, is a shared memory. In an embodiment, a first monitoring module and/or the first guest system 32 have read only access to the data output memory and/or the second guest system 34 has full access (read and write) to the data output memory.

The second guest system 34 is adapted to run a first module 50 on the operating system 48. Optionally or additionally, the second guest system 34 is adapted to run one or more second modules 52 for uncritical functions. The first module 50 of the second guest system 34 is adapted to obtain, in particular to retrieve or read, the safety-critical information from the data input source 40. Then, the first module 50 is adapted to prepare or render at least one display frame to be sent to a display. The display frame includes the safety-critical information based on the read safety-critical information from the data input source 40. According to embodiments, the display frame includes non-safety-critical information generated by the one or more second modules 52 and/or the first module 50.

Further, the second guest system, in particular the first module 50, is adapted to write the address and properties of the prepared display frame into suiting registers of the display controller 15. According to another embodiment, the data output memory may be also for a virtual device, for example a sharing logic, assigning and managing the access to a shared physical device to several guest systems via inter partition communication links. Even though the present invention describes in detail a specific hardware interface, for example the display controller 15, it may also apply to other hardware or software interfaces. The display controller 15 then sends the display frames to the one or more display ports 11. Then, the at least one frame is displayed on the one or more displays 13. The first monitoring module 44 of the first guest system 32 is adapted to check the real-time behavior of the first modules 50 provided by the second guest system 34. And the second monitoring module 46 is adapted to check the content of the output of the first module 50 of the second guest system 34. According to an embodiment, the first and second monitoring modules 44, 46 may be realized in a single module or be split up into three or more modules.

Depending on the risk classification needed, several methods exist for the technical realization of output data checking which are described in the following. For example the ISO 26262 defines several Automotive Safety Integrity Levels (ASIL), from ASIL A (lowest integrity requirement) to ASIL D (highest integrity requirement).

For example, one output data checking method is based on the analysis of the frame buffer memory. It can be used up to ASIL-A, because the data output check does not logically include checking of the display controller hardware, but relies on its proper function.

In another embodiment, another output data checking method is to use a display data checking hardware module which is provided on the path between the graphic controller 15 and the display port 11, in particular at the output of the graphic controller 15. The display data checking hardware module is adapted to compare one or more portions of the at least one display frame in the data sent from the graphic controller 15 to the display port 11, with some pre-defined pixel content, for example stored in the display data checking hardware module. For example, the monitoring module 44 of the first guest system 32 is able to configure the display data checking hardware module and to request the checking status. For example, the display data checking hardware module provides a result of a check to the first guest system 32 whether at least one portion of the at least one display frame includes the information that may be sent to the second operating system 34. In an embodiment, the check may use techniques described with respect to other embodiments, for example image recognition techniques explained here-below.

According to an embodiment, the display data checking hardware module reads a display frame or at least one portion of the at least one display frame before the output encoder of the graphic controller 15.

Subsequently, the first guest system, in particular the first and/or second monitoring modules 44, 46, are adapted to determine from the result received from the display data checking hardware module to determine, whether at least one portion of the at least one display frame includes the information that was sent to the second operating system 34 and in particular that the information was correctly generated. Such a solution can be used up to ASIL-B, because the checking method includes checking the display controller correct function, but does not include for example the display port or cable.

According to another embodiment, another output data checking method uses a back-channel for display data. For example a wire from the display port 11 is extended and in addition routed to a camera port (not shown) or another image grabbing device. According to some embodiments, one or multiple regions of interest of each output frame is read from the image grabbing device, for example by the first and/or second monitoring modules 44, 46 of the first guest system 32.

The first monitoring module 44 is adapted to obtain, in particular to retrieve or read, the safety-critical information from the data input source 40 and to provide the safety-critical information to the second monitoring module 46. Thus, the first monitoring module 44 is adapted determine the time, when the data input source 40 has provided the safety-critical information. From a safety perspective, this embodiment is stronger than the one described above that uses display data checking hardware module, because it verifies the critical image content on the real wire, which means behind the display output encoder hardware, between the controller and the display, while the display data checking hardware module verify the critical information before the output encoder of the graphic controller 15.

According to an embodiment, the first monitoring module 44 receives the time, when the safety-critical information has been provided in the display frame from the second monitoring module 46. According to embodiments, the first monitoring module 44 is adapted to determine whether the safety-critical information obtained from the data input source 40 is generated in the display frame within a predefined time period. For example, the predefined time period is between 50 and 200 milliseconds, in particular below 200 milliseconds, for example below 50 or 100 milliseconds.

In an embodiment, the second monitoring module 46 is adapted to determine the actual memory location of the current output, for example the prepared display frames by the second guest system 34, from the physical device registers, if the output target is a physical device (e.g. the display 13). For example, the second monitoring module 46 is adapted to determine the location of the prepared display frame in the frame buffer 17.

Then, the first guest system 32, in particular the second monitoring module 46, is adapted to read at least one portion 60, 62, 64, 66 of the display frame. The portion 60, 62, 64, 66 covers at least a part of the display where the safety-critical information is to be displayed.

FIG. 2 shows several portions 60, 62, 64, 66. The portions are located on the display frame respectively at a position, where the safety-critical information read or obtained by the first module 50 should be displayed. According to an embodiment, the width of the portion of the display frame is at least 5 times smaller, in particular 20 times smaller, for example more than 50 or 100 times smaller than the width of the display frame. In an embodiment, the height of the display frame is at least 5 times higher, in particular at least 20 times higher, for example more than 50 or 100 times higher than the height of the portion of the display frame. In some embodiments, the at least one portion 60, 62, 64, 66 of the display frame is square shaped. For example the at least one portion 60, 62, 64, 66 may have a width and/or height of between 20 and 100 pixels.

According to an embodiment, the first safety-critical information is a speed value. Then, a first portion 60 of the display frame is located at a position, where the speed value should be displayed on the display. For example so that the first portion 60 covers at least a part of the needle 22 at the expected speed value. In other words, the location of the first portion depends on the speed value, or more generally the location depends on the value of the safety-critical information.

In an embodiment, the second safety-critical information is the information that the battery charge is low. Then, a second portion 62 of the display frame is located at a position, where a battery symbol 24 should be displayed on the display (frame), so that the second portion 62 covers at least a part of the battery symbol.

The same applies for the third portion 64 and the fourth portion with respect to the brake symbol 26 and the belt symbol 28.

According to embodiments, the second monitoring module 46 is adapted to determine the position on the display frame of the at least one portion 60, 62, 64, 66 of the at least one display frame depending on the information to be displayed. For example, the second monitoring device is adapted to retrieve from a memory, in particular a database or a table, where for each safety-critical information, in particular for each value of the safety-critical information, the position on the display frame of the portion 60, 62, 64, 66 of the display frame is stored. For example, the position on the display frame of the first portion 60 may depend on the speed to be displayed. Further, the database or table may also include a bitmap of an icon. In other words, the data base or table stores a-priori information of how the safety critical information is to be displayed. According to some embodiments, the a-priori information of the safety critical information is available to first module 50 for rendering the frames and the second monitoring module 46 to be able to verify the content.

According to an embodiment, the first guest system only reads every second or third line and/or row of the at least one portion 60, 62, 64, 66 of the at least one display frame. This may even speed up the detection of the first and/or second monitoring module.

In an embodiment, the second monitoring module 46 is adapted to determine whether the information obtained by the first module 50 is correctly generated to be displayed on the display 13. For example, the content of the at least one portion 60, 62, 64, 66 is used. For that purpose the second monitoring module 46 may use one or more processes.

For example, it may use an image recognition method to determine the content of the least one portion. For example a location, color and/or shape of an icon or character is detected.

The verification method is dependent on the safety-critical information displayed.

In an embodiment, in case of a static two-color icon, the a-priori information includes the bitmap of the icon. The second monitoring module 46 could test all pixels, the pixel values on a trace, on every second or third line and/or row, some (e.g. 20-50) random locations in the icon, checksum of pixel values, and so on. For example, the second monitoring module may determine a checksum of each portion of the at least one display frame and compare the checksum with a stored reference checksum. In an embodiment, the reference checksum may be stored in the memory 5, in particular in the a-priori information. In an embodiment, the checksum of the at least one portion before and after the preparation of the display frame is determined and compared. In another embodiment, the absolute differences in RGB values of selected pixel positions of both, the display output region of interest and the stored pixmap are summed up, to form a measure for the degree of differences; when this value exceeds a pre-defined threshold, it is an indicator for not showing the symbol on the display.

In other words, the portion is compared with an image stored in the memory 5.

In an embodiment, in case of the needle of a speedometer 20 or another analog instrument is emulated, the a-priori information includes a 2-D or 3-D model or the shape of the needle, the characteristic curve of the instrument (needle position over speed value) and the like. The second monitoring module 46 could perform image processing algorithms like digital filters, for example edge filter or erosion filter, best fit algorithms, and the like. For example, an edge filter may be used to determine a position of a needle 22 in the at least one portion.

In particular to reverse the information (from tachometer image to a speed value), the image processing algorithms can be performed on the whole tachometer area and/or within a small rectangle around a pre-computed location where the needle tip is expected to be rendered to.

Further, the second monitoring module 46 informs the first monitoring module, if and when the information, in particular the safety-critical information has been displayed.

According to an embodiment, if the second monitoring module 46 and/or the first monitoring module 44 determine that the safety-critical information has not been correctly displayed, in particular within a predetermined time period, the first guest system 32, in particular the second monitoring module 46 and/or the first monitoring module 44 are adapted to command the ECU to enter a safe state. The safe state is well defined by the original equipment manufacturer (OEM) requirements and depends on the information to be displayed. The purpose of the safe state is to make it obvious to the vehicle driver that the safety function is currently not available, in particular until the system has recovered from that fault condition, for example until the second operating system 48 has been rebooted and/or recovered to correctly generate the safety-critical information again.

For example the safe state includes to command the first guest system, the second guest system, the graphic controller 15 or the ECU to blank the display, to switch off the display backlight, to display a default screen, for example a warning screen and/or to fall-back to a simpler rendering scheme. For example, the first monitoring module 44 and/or the second monitoring module 46 are adapted to write into the frame buffer for that purpose. According to an embodiment, the default screen may contain the information that the control device 1 is not correctly working.

After entering the safe state, the first monitoring module 44 is adapted to perform a fault recovery, for example to reboot the device, to stop execution of the second guest system 34, to restart the second guest system 34, to retrigger the duty (for example to try to render again), to reset the display hardware and/or to restart the first module 50.

The present disclosure combines two supervision concepts: supervision of output data, i.e. the display frame, and supervision of the timing behavior. While supervision of timing behavior can be implemented using timer resources and knowing the requirements only, the supervision of output data usually needs some a-priori information of the processing details within first guest system 32.

In the following, two practical examples are given.

Example 1: The supervision of the output (display on the screen) of safety-critical symbols that need to be shown to the vehicle driver by an instrument cluster component. One of the safety-critical functions is to display safety-critical icons on the instrument cluster screen—the requirements tell that such a symbol shall be shown within a certain time period when the respective command has been received. Supervision of such a function means to validate each output, which is a rendered screen image, by finding the critical symbols in the image data. The memory location is determined by reading from the display hardware registers. The a-priori information used for efficient implementation of such a supervision function is location, colors and shape of the icon.

Example 2: The supervision of the display of the current speed value on an instrument cluster display. The second monitoring module 46 needs the a-priori information about the speedometer instrument and speed needle geometry, which is rendered into an area of the instrument cluster display. The second monitoring module 46 pre-calculates the due position of the speedometer needle and investigates a small tile that should contain the needle image, to determine the actual speed value presented to the driver.

The described supervision functions have the purpose to detect every violation of the safety requirements that apply for first module 50.

Figure 4:
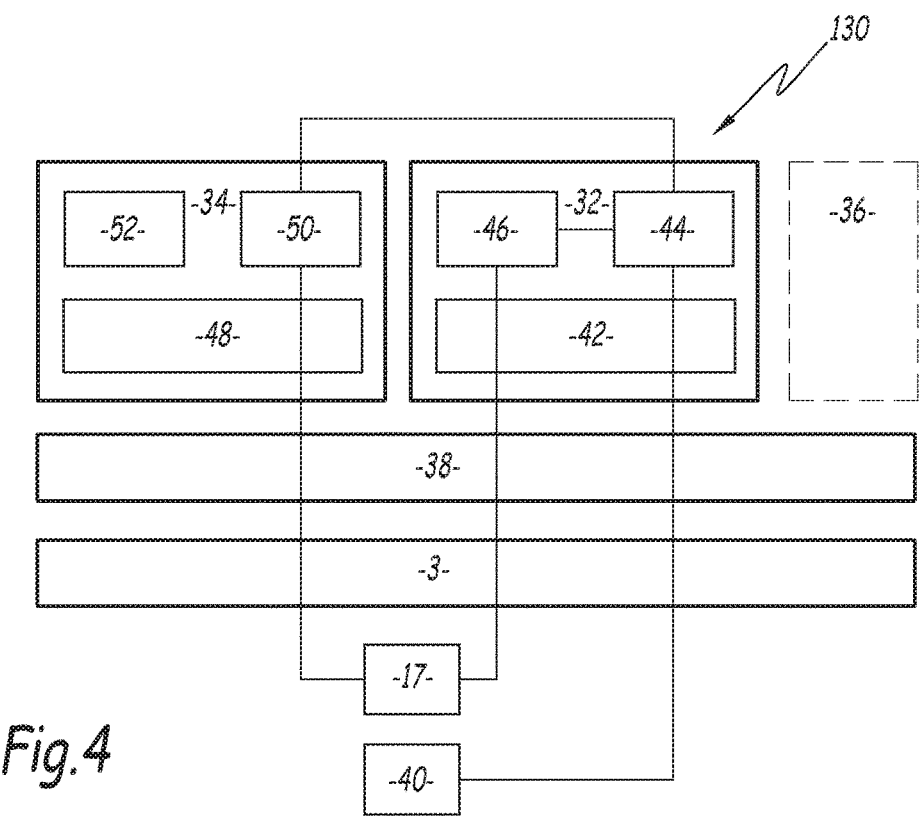
FIG. 4 shows schematically another system according to an embodiment.
Figure 5:
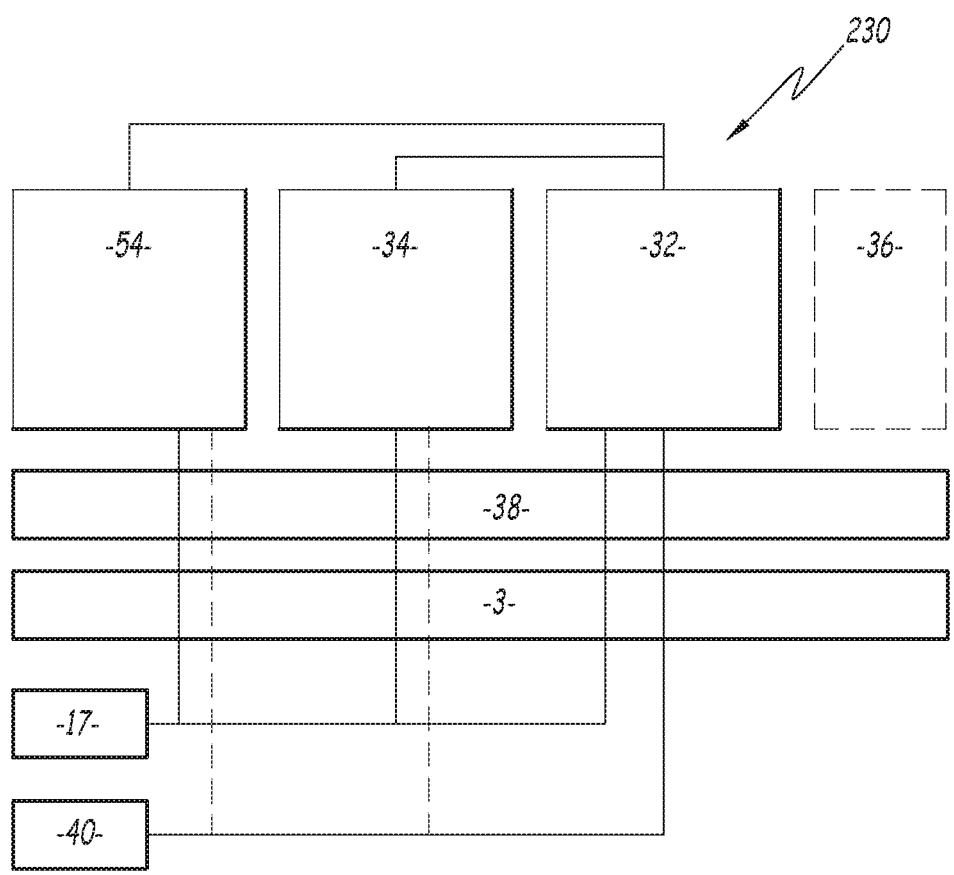
FIG. 5 shows schematically a further system according to an embodiment.

FIG. 4 shows a variation of the system shown in FIG. 3. The same features are designated with the same reference signs. Only the differences to the embodiment of FIG. 3 will be explained in the following.

In FIG. 4, the first guest system 32, in particular the first monitoring module 46, has exclusive access to the data input source 40, in particular to the input device or its associated memory. In other words, no other guest system in the system 130 has access to the to the data input source 40. The exclusive access to the data input source 40 is provided by the virtualization layer 38.

In the system, the first monitoring module 44 obtains the safety-critical information from the data input source 40. Then, the first monitoring module 44 is adapted to send the safety-critical information to the first module 50 of the second guest system 34, for example via an inter-process-communication link. Thus, the first monitoring module 44 has the information, when the safety-critical information was received by the first module 50 for calculating, whether the information is generated in the predefined time period.

FIG. 3 shows a further embodiment of a system 230. The same features are designated with the same reference signs as in the embodiments of FIGS. 3 and 4. Only the differences to the embodiment of FIGS. 3 and/or 4 will be explained in the following.

As discussed above, in case of a detection of a fault, for example that the safety-critical information has not been correctly displayed, in particular within a pre-determined time period, in the embodiments of FIGS. 3 and 4 the second guest system 34 is stopped. However, in such a case, rebooting the second guest system 34 needs some time until it becomes available again, which is observable to the passenger or driver of the vehicle.

Therefore, in the system 230, a third, redundant guest system 54, being redundant to the second guest system 34 is provided. For example, the third guest system 54 may be a second instance of the second guest system 34. Thus, in case of a detection of a fault, be explained in the following.

According to an embodiment, which may be combined with any other embodiments disclosed herein, in case of a detection of a fault, for example that the safety-critical information has not been correctly displayed, in particular within a predetermined time period, the third guest system 54 is activated and takes over the function of the second guest system 34. Taking over from a well-prepared state is expected to take only some 100 milliseconds, performing mainly two tasks: resetting and initialization of the graphics hardware, for example the graphic controller 15, and receiving the recorded state from the first and/or second monitoring modules 44, 46.

Figure 6:
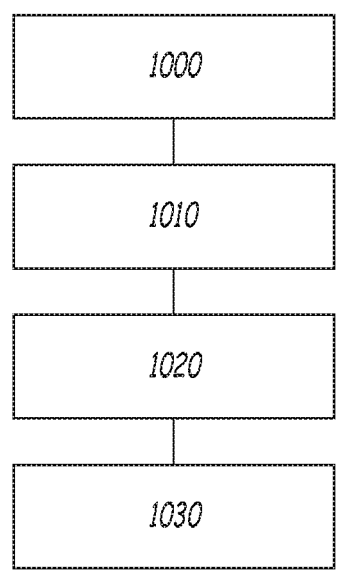
FIG. 6 shows schematically a flow chart of a method according to an embodiment.

FIG. 6 shows a flow chart according to an embodiment disclosed herein.

In box 1000 the second guest system 34, obtains information to be displayed on a display. For example, the second guest system, in particular the first module 50 of the second guest system reads the information, in particular the safety-critical information, from the data input source 40. In other embodiments, the first guest systems 32 reads the information from the data input source 40 and provides the information to the second guest system 34.

In box 1010, the second guest system prepares at least one display frame to be sent to the display 13. For example, the second guest system is adapted to use the obtained information for generating an icon, symbol, number on the display frame, so that it can be displayed on the display 13.

In box 1020, first guest system reads at least one portion of the at least one display frame. As explained here-above for that purpose the position on the display frame of the at least one display frame has to be determined.

In box 1030 the first guest system, determines whether the information sent to the second operating system is correctly generated in the display frame. In other words it is supposed that the content of the display frame is the content, which is displayed on the display 13.

According to embodiments, the disclose may be applied to arbitrary safety functions with arbitrary input, in particular vehicle network interface input, and output interfaces, in particular display output interfaces.

The invention claimed is:

1. A method for operating an electronic control unit comprising at least one processor and at least one memory connected to the at least one processor, the method comprising:
   running a virtualization layer on the at least one processor, the virtualization layer being adapted to assign processor time and memory to a plurality of guest systems running on the virtualization layer, the plurality of guest systems comprising a first guest operating system and a second guest operating system, wherein the first guest operating system is a real time operating system;
   obtaining, by the second guest system, information comprising a value of safety-critical information to be displayed on a display;
   rendering, by the second guest system, a display frame to be sent to the display, the display frame including the safety-critical information obtained by the second guest system;
   determining, by the first guest system, a position of a portion of the display frame based on the information to be displayed, wherein a width of the display frame is at least 5 times larger than a width of the portion of the display frame, and/or a height of the display frame is at least 5 times larger than a height of the portion of the display frame, and wherein the portion is located at a position where the safety-critical information obtained by the second guest system should be displayed;
   reading, by the first guest system, the portion of the display frame, or retrieving, by the first guest system, information about a read portion of the display frame;
   determining, by the first guest system, whether the information obtained by the second guest system is correctly generated in the display frame based on the portion; and
   determining whether the information is generated in the display frame within a predefined time period, wherein if it is determined that the information is not generated in a predefined time period and/or is not correctly generated, the method further comprises at least one of:
   commanding the control unit to enter a safe state; and
   commanding the control unit to perform a fault recovery comprising rebooting the control unit.

2. The method according to claim 1, further comprising writing, by the second guest system, the display frame into a data output memory of a graphic controller, wherein said reading comprises reading, by the first guest system, the portion of the display frame from the data output memory.

3. The method according to claim 2, further comprising determining a location of the display frame in the data output memory.

4. The method according to claim 1, further comprising:
   providing, by the second guest system to a graphic controller, the display frame; and
   rendering, by the graphic controller, the display frame to the display,
   wherein said retrieving comprises obtaining, from a display data checking hardware module, at least one result about a check, as to whether the portion of the display frame, rendered by the graphic controller and read by the display data checking hardware module, with the information that was obtained by the second guest system included therein, is correctly generated in the display frame, based on the portion.

5. The method according to claim 4, wherein said determining whether the information obtained by the second guest system is correctly generated comprises analyzing the at least one result obtained from the display data checking hardware module.

6. The method according to claim 1, further comprising:
   providing, by the second guest system to a graphic controller, the display frame;
   capturing, by an image grabbing device, the portion of the display frame sent from the graphic controller to the display port; and
   storing, the captured portion of the display frame in the at least one memory,
   wherein said reading comprises reading, by the first guest system, the captured portion of the display frame.

7. The method according to claim 1, wherein said determining whether the information obtained by the second guest system is correctly generated comprises at least one of:
   (a) determining a check sum of the portion before and after the preparation of the display frame and comparing the check sums;
   (b) determining a check sum of the portion and comparing the determined check sum with a reference check sum;
   (c) using a digital filter and/or a best fit algorithm to determine a position of a needle in the portion; and
   (d) comparing the portion with a stored image.

8. The method according to claim 1, wherein the first guest system only reads every second or third line and/or row of the portion of the display frame for said determining whether the information obtained by the second guest system is correctly generated.

9. The method according to claim 1, wherein the display is a display of an instrument cluster of a vehicle.

10. The method according to claim 1, wherein said obtaining comprises sending, by the first guest system, information to the second guest system to be displayed on the display.

11. The method according to claim 1, wherein a width of the display frame is at least 20 times larger than a width of the portion of the display frame, and/or a height of the display frame is at least 20 times larger than a height of the portion of the display frame.

12. The method according to claim 1, wherein the value of the safety-critical information comprises at least one of:
a speed value;
a rotational speed value;
an energy consumption value; and
a battery value.

13. The method according to claim 1, wherein entering the safe state comprises at least one of:
displaying a blank screen;
switching off a backlight of the display;
displaying a default screen; and
falling back to a simpler rendering scheme;
and wherein the fault recovery further comprises at least one of:
rebooting the second guest system;
resetting a display hardware of the display;
restarting a module generating the display frame; and
switching to a third guest system that is redundant to the second guest operating system.

14. The method according to claim 13, wherein the safe state remains activated until the second or the third guest system generates correctly the information in the display frame.

15. The method according to claim 1, wherein the first guest system is adapted to run a safety qualified operating system, and the second guest system is adapted to run an operating system which is not qualified for safety.

16. A non-transitory computer readable medium storing a program comprising commands which, when loaded and executed on one or more processors of an electronic control unit, cause the one or more processors to:
run a virtualization layer on the one or more processors, the virtualization layer being adapted to assign processor time and memory to a plurality of guest systems running on the virtualization layer, the plurality of guest systems comprising a first guest operating system and a second guest operating system, wherein the first guest operating system is a real time operating system;
obtain, by the second guest system, information comprising a value of safety-critical information to be displayed on a display;
render, by the second guest system, a display frame to be sent to the display, the display frame including the safety-critical information obtained by the second guest system;
determine, by the first guest system, a position of a portion of the display frame based on the information to be displayed, wherein a width of the display frame is at least 5 times larger than a width of the portion of the at least one display frame, and/or a height of the display frame is at least 5 times larger than a height of the portion of the display frame, and wherein the portion is located at a position where the safety-critical information obtained by the second guest system should be displayed;
read, by the first guest system, the portion of the display frame, or retrieve, by the first guest system, information about a read portion of the display frame;
determine, by the first guest system, whether the information obtained by the second guest system is correctly generated in the display frame based on the portion; and
determine whether the information is generated in the display frame within a predefined time period, wherein if it is determined that the information is not generated in a predefined time period and/or is not correctly generated, the program further comprising commands which causes the one or more processors to perform at least one of:
command the control unit to enter a safe state; and
command the control unit to perform a fault recovery comprising rebooting the control unit.

17. An electronic control unit comprising:
at least one processor;
at least one memory connected to said at least one processor; and
a virtualization layer adapted to run on said at least one processor, the virtualization layer being adapted to assign processor time and memory to a plurality of guest systems running on the virtualization layer, the plurality of guest systems comprising a first guest operating system and a second guest operating system, wherein the first guest operating system is a real time operating system, the second guest system being adapted to obtain safety-critical information to be displayed on a display, the second guest system being adapted to render a display frame to be sent to the display, the display frame including the safety-critical information obtained by the second guest system, and the first guest system being adapted:
to determine a position of a portion of the display frame based on the information to be displayed, wherein a width of the display frame is at least 5 times larger than a width of the portion of the display frame, and/or a height of the display frame is at least 5 times larger than a height of the portion of the at least one display frame, and wherein the portion is located at a position where the safety-critical information obtained by the second guest system should be displayed,
to read the portion of the display frame, or to retrieve information about a read portion of the display frame,
to determine, based on the portion, whether the information obtained by the second guest system is correctly generated in the display frame, and
to determine whether the information is generated in the display frame within a predefined time period, wherein if it is determined that the information is not generated in a predefined time period and/or is not correctly generated, the first guest system being further adapted to perform at least one of:
command the control unit to enter a safe state; and
command the control unit to perform a fault recovery comprising rebooting the control unit.

* * * * *